United States Patent
Doong et al.

(10) Patent No.: US 10,399,007 B2
(45) Date of Patent: Sep. 3, 2019

(54) TEMPERATURE SWING ADSORPTION PROCESS AND APPARATUS WITH CLOSED LOOP REGENERATION

(71) Applicant: UOP LLC, Des Plaines, IL (US)

(72) Inventors: Shain-Jer Doong, Kildeer, IL (US); Christopher B. McIlroy, Park Ridge, IL (US)

(*) Notice: Subject to any disclaimer, the term of this patent is extended or adjusted under 35 U.S.C. 154(b) by 193 days.

(21) Appl. No.: 15/687,221

(22) Filed: Aug. 25, 2017

(65) Prior Publication Data

US 2018/0126299 A1    May 10, 2018

Related U.S. Application Data

(60) Provisional application No. 62/419,212, filed on Nov. 8, 2016.

(51) Int. Cl.
*B01D 53/04* (2006.01)
*B01D 15/16* (2006.01)

(52) U.S. Cl.
CPC ....... *B01D 15/161* (2013.01); *B01D 53/0462* (2013.01); *B01D 2253/106* (2013.01);
(Continued)

(58) Field of Classification Search
CPC ............... B01D 53/04; B01D 53/0462; B01D 2253/106; B01D 2256/24; B01D 2257/30; B01D 2257/302; B01D 2257/306
(Continued)

(56) References Cited

U.S. PATENT DOCUMENTS 3,527,024 A * 9/1970 Loomer ................. B01D 53/04
                                                              95/115
3,540,188 A * 11/1970 Barrere, Jr. ........ B01D 53/0454
                                                              95/12
(Continued)

OTHER PUBLICATIONS

Ambrozek, Studies of the removal of volatile organic compounds (VOCs) from waste air streams in thermal swing adsorption (TSA) system with closed-loop regeneration of adsorbent, Modelling and Optimisation for Energy Saving and Pollution Reduction, PRES 2012; Prague; Czech Republic; Aug. 25, 2012 through Aug. 29, 2012.

(Continued)

*Primary Examiner* — Frank M Lawrence, Jr.

(57) ABSTRACT

A temperature swing adsorption apparatuses and process is disclosed comprising passing a feed stream to a first adsorption bed to adsorb one or more contaminants from the feed stream to produce a product stream. A regeneration gas separator overhead stream is passed to a second adsorption bed to provide a second adsorption bed effluent stream. The second adsorption bed effluent stream is passed to a heater to generate a hot regeneration effluent stream. The hot regeneration effluent stream is passed to a third adsorption bed to regenerate the third adsorption bed and provide a regeneration effluent stream. At least a portion of the regeneration effluent stream is passed to a guard bed to remove sulfur and oxygen compounds to provide a treated regeneration effluent stream. The treated regeneration effluent stream is passed to a regeneration gas separator to provide the regeneration gas separator overhead stream.

20 Claims, 4 Drawing Sheets

(52) U.S. Cl.
CPC ...... *B01D 2256/24* (2013.01); *B01D 2257/30* (2013.01); *B01D 2257/306* (2013.01)

(58) Field of Classification Search
USPC ........ 95/121, 122, 126, 130, 146; 96/98, 99, 96/115, 135, 137, 148
See application file for complete search history.

(56) References Cited

U.S. PATENT DOCUMENTS

| | | | |
|---|---|---|---|
| 3,713,272 A * | 1/1973 | Barrere, Jr. | B01D 53/04 95/126 |
| 3,890,120 A * | 6/1975 | Guyot | B01D 53/52 95/136 |
| 4,000,990 A | 1/1977 | Bingham | |
| 4,061,724 A | 12/1977 | Grose et al. | |
| 4,073,865 A | 2/1978 | Flanigen et al. | |
| 4,310,440 A | 1/1982 | Wilson et al. | |
| 4,421,532 A * | 12/1983 | Sacchetti | B01D 53/04 95/104 |
| 4,440,871 A | 4/1984 | Lok et al. | |
| 4,469,665 A * | 9/1984 | Pinto | B01D 53/04 423/359 |
| 4,775,396 A | 10/1988 | Rastelli et al. | |
| 4,935,580 A | 6/1990 | Chao et al. | |
| 4,971,606 A | 11/1990 | Sircar et al. | |
| 5,089,034 A | 2/1992 | Markovs et al. | |
| 7,231,784 B2 | 6/2007 | Howard et al. | |
| 8,936,669 B2 | 1/2015 | Doong et al. | |
| 9,023,244 B2 | 5/2015 | Jadhav | |
| 2012/0085232 A1 | 4/2012 | Sethna et al. | |
| 2013/0192299 A1 * | 8/2013 | Dolan | C10L 3/101 62/636 |
| 2014/0224118 A1 | 8/2014 | Zhou et al. | |
| 2014/0357926 A1 | 12/2014 | Doong et al. | |
| 2015/0105599 A1 | 4/2015 | Riley et al. | |
| 2017/0087505 A1 * | 3/2017 | Hashi | B01D 53/0423 |

OTHER PUBLICATIONS

Plain, Residue desulphurisation and conversion, PTQ Q2 2006.
Tromeur, Hydroprocessing atmospheric and vacuum residues, PTQ Spring 2000.

* cited by examiner

TEMPERATURE SWING ADSORPTION PROCESS AND APPARATUS WITH CLOSED LOOP REGENERATION

CROSS-REFERENCE TO RELATED APPLICATION

This application claims priority from Provisional Application No. 62/419,212 filed Nov. 8, 2016, the contents of which cited application are hereby incorporated by reference in its entirety.

FIELD

The technical field generally relates to processes and apparatuses for processing fluids in fluid separation systems. More particularly, the present disclosure relates to temperature swing adsorption systems and methods for purifying fluids using temperature swing adsorption systems.

BACKGROUND

Due to the abundance of natural gas in North America there is a shift occurring from importing Liquefied natural gas (LNG) to exploring the option of exporting LNG. A network of natural gas pipelines exist to supply feed gas to an LNG plant. UOP's SeparSIV™ is an adsorption-based technology as part of an LNG pretreatment step to remove heavy hydrocarbons and prevent freezing of these heavies in LNG production.

The SeparSIV process is based on the principle of temperature swing adsorption (TSA). TSA is a batch-wise process consisting of two basic steps: adsorption and regeneration. In the adsorption step, contaminants or other impurities are removed from the fluid by adsorption onto a solid adsorbent material and then the treated stream leaves the unit with lowered contaminant levels. In the regeneration step, the adsorbed contaminants are desorbed from the solid adsorbent material by means of a regeneration stream (typically a gas stream).

The regeneration step includes two major parts: heating and cooling. In the heating part of the process, the regeneration stream is heated to an elevated temperature and caused to flow over the solid adsorbent material. Due to the heat of the gas and the difference in partial pressure of the contaminants on the solid adsorbent material and in the regeneration gas stream, the contaminants desorb from the solid material and leave the unit with the regeneration gas. A cooler is then used to condense the contaminants from the regeneration gas. In the case that the desorbed contaminants in the regeneration gas cannot be removed by condensation (such as $CO_2$ removal), other separation means are employed to separate the contaminants from the regeneration gas, such as membrane or solvent absorption separation. The cooled regeneration gas, which is saturated with the contaminants, can then be recycled to the feed in a closed-loop mode to minimize the loss of the regeneration gas. Further, because adsorption is promoted by low temperatures, regeneration typically also includes another cooling step subsequent to exposing an adsorbent bed to the hot regeneration gas. In this cooling step, the adsorbent bed is subjected to a flow of cooling gas, which cools the adsorbent bed down from approximately the high temperature of the hot regeneration gas to approximately the low adsorption temperature in readiness for a subsequent adsorption step. Alternatively, in an open-loop regeneration mode, the effluent regeneration gas can be disposed of as a fuel gas or by venting instead of returning to the feed stream.

Hence, the most basic form of a TSA process unit consists of two vessels, with one vessel in adsorption mode and the other vessel in regeneration mode. However, depending on the quantity of feed material to be treated as well as the amount of contaminants to be removed from the feed stream, several vessels, which operate in a parallel mode, or in alternating sequences, could be required. In a more complicated form of operation, the regeneration step can also be split over two vessels in a series-heat-and-cool cycles, where one of the vessels would be in the heating step and another would be in the cooling step.

The pipeline feed gas to an LNG plant may contain oxygen and various sulfur contaminants which can cause operating issues for adsorbent based systems such as SeparSIV. In the various TSA arrangements, the presence of oxygen in the hot regeneration gas can lead to poor performance due to reaction of oxygen with hydrocarbons, resulting in failure to meet the product water specification. Issues with oxygen are amplified in the presence of even ppmv levels of sulfur, such as $H_2S$ or mercaptans, due to formation of elemental sulfur in the bed which can substantially impact bed life and overall unit performance. These reactions can occur during the high temperature bed regeneration step. In general, with respect to the downstream LNG requirement, oxygen and sulfur compounds can be slipped into the product stream without being removed by SeparSIV. There remains a need for a process solution to address the presence of oxygen and sulfur impurities.

Accordingly, it is desirable to provide TSA systems and associated fluid purification methods that address the presence of oxygen and sulfur compounds present in the feed to the LNG plant. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Various embodiments contemplated herein relate to a temperature swing adsorption process with closed loop regeneration. The exemplary embodiments taught herein provide an improved temperature swing adsorption process and apparatus for removing oxygen and sulfur compounds from a feedstream comprising natural gas.

In accordance with an exemplary embodiment, a temperature swing adsorption process comprises passing a feed stream to a first adsorption bed to adsorb one or more contaminants comprising heavy hydrocarbons from the feed stream to produce a product stream. A regeneration gas separator overhead stream is passed to a second adsorption bed to reduce a temperature of the second adsorption bed and provide a second adsorption bed effluent stream. The second adsorption bed effluent stream is passed to a heater to increase a temperature of the second adsorption bed effluent stream to generate a hot regeneration effluent stream. The hot regeneration effluent stream is passed to a third adsorption bed to regenerate the third adsorption bed via an increase in a temperature of the third adsorption bed and provide a regeneration effluent stream. At least a portion of the regeneration effluent stream is passed to a guard bed to remove one or more impurities comprising sulfur and oxygen compounds to provide a treated regeneration effluent stream. The treated regeneration effluent stream is passed to a regeneration gas separator to separate a liquid stream and provide the regeneration gas separator overhead stream.

In accordance with another exemplary embodiment, a temperature swing adsorption system comprises a first adsorption bed configured to receive a feed stream and adsorb one or more contaminants from the feed stream to produce a product stream. A second adsorption bed is in downstream communication with a regeneration gas separator overhead line comprising a regeneration gas separator overhead stream to reduce a temperature of the second adsorption bed and provide a second adsorption bed effluent stream. A heater is in downstream communication with the second adsorption bed and configured to increase a temperature of the second adsorption bed effluent stream to generate a hot regeneration effluent stream. A third adsorption bed is in downstream communication with the second adsorption bed and configured to receive the hot regeneration effluent stream to regenerate the third adsorption bed via an increase a temperature of the third adsorption bed and provide a regeneration effluent stream in a regeneration effluent line. A guard bed is in downstream communication with the regeneration effluent line configured to remove one or more impurities comprising sulfur and oxygen compounds to provide a treated regeneration effluent stream in a treated regeneration effluent line. A regeneration gas separator is in downstream communication with the treated regeneration effluent line to separate a liquid stream and provide the regeneration gas separator overhead stream.

In accordance with yet another exemplary embodiment, a temperature swing adsorption process comprises passing a feed stream to a first adsorption bed to adsorb one or more contaminants comprising heavy hydrocarbons from the feed stream to produce a product stream. A first portion of the product stream is passed to a guard bed to remove one or more impurities comprising oxygen and sulfur compounds to provide a treated product stream. The treated product stream is passed to a second adsorption bed to reduce a temperature of the second adsorption bed and provide a second adsorption bed effluent stream. The second adsorption bed effluent stream is passed to a heater to increase a temperature of the second adsorption bed effluent stream to generate a hot regeneration effluent stream. The hot regeneration effluent stream is passed to a third adsorption bed to regenerate the third adsorption bed via an increase in a temperature of the third adsorption bed and provide a regeneration effluent stream. The regeneration effluent stream is passed to a regeneration gas cooler to provide a cooled regeneration effluent. The cooled regeneration effluent is passed to the regeneration gas separator to provide a regeneration gas separator overhead stream and liquid stream. The regeneration gas separator overhead stream is passed to the first adsorption bed.

DEFINITIONS

Figure 1:
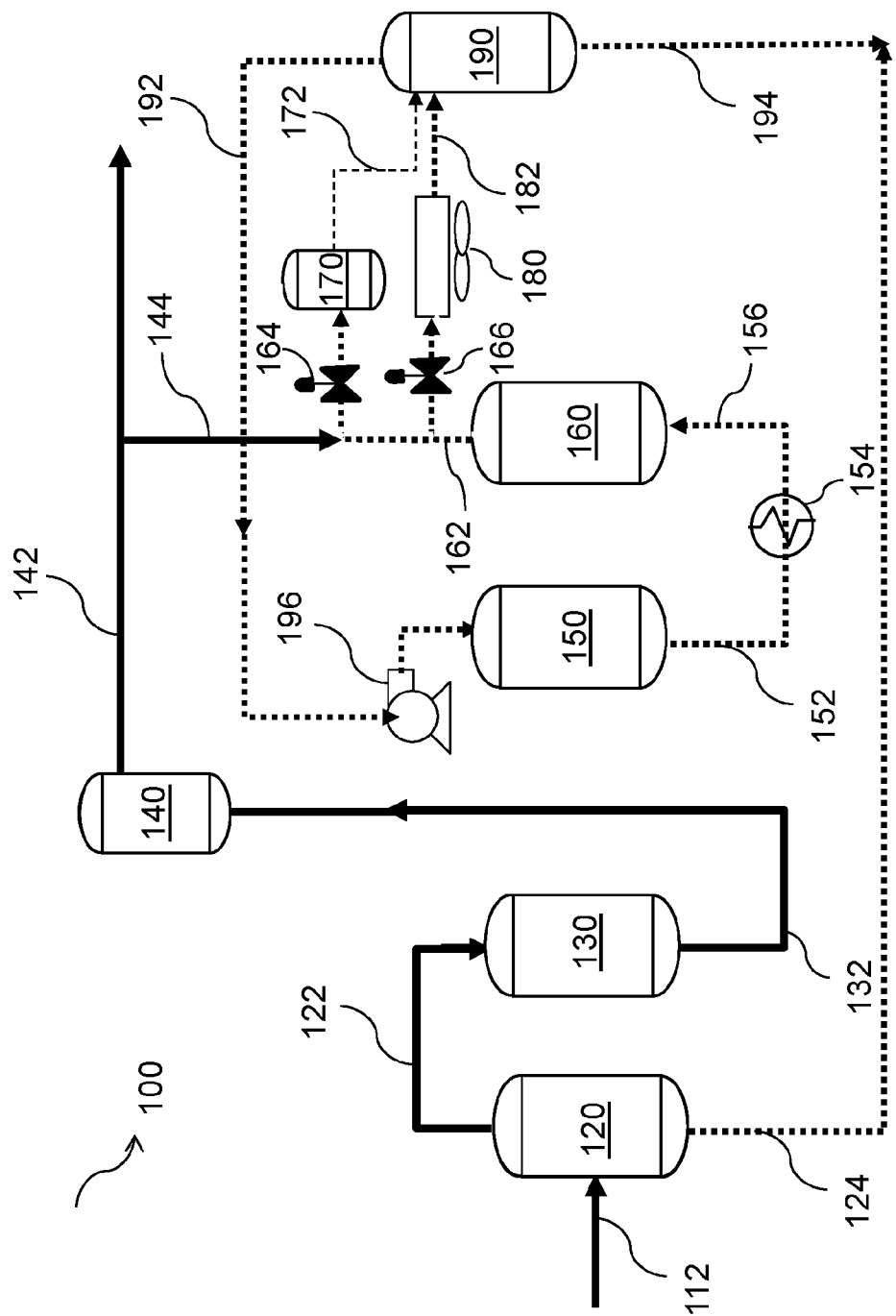
FIG. 1 is a schematic depiction of an exemplary apparatus according to an exemplary embodiment.

As used herein, the term "stream" can include various hydrocarbon molecules, such as straight-chain, branched, or cyclic alkanes, alkenes, alkadienes, and alkynes, and optionally other substances, such as gas, e.g., hydrogen, or impurities, such as heavy metals, and sulfur and nitrogen compounds. The stream can also include aromatic and non-aromatic hydrocarbons. Moreover, the hydrocarbon molecules may be abbreviated $C_1$, $C_2$, $C_3$ ... Cn where "n" represents the number of carbon atoms in the one or more hydrocarbon molecules. Furthermore, a superscript "+" or "−" may be used with an abbreviated one or more hydrocarbons notation, e.g., $C_{3+}$ or $C_{3-}$, which is inclusive of the abbreviated one or more hydrocarbons. As an example, the abbreviation "$C_{3+}$" means one or more hydrocarbon molecules of three carbon atoms and/or more.

As used herein, the term "stream", "feed", "product", "part" or "portion" can include various hydrocarbon molecules, such as straight-chain and branched alkanes, naphthenes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

As used herein, the term "overhead stream" can mean a stream withdrawn at or near a top of a vessel, such as a column.

As used herein, the term "bottoms stream" can mean a stream withdrawn at or near a bottom of a vessel, such as a column.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "passing" means that the material passes from a conduit or vessel to an object.

As depicted, process flow lines in the FIGURES can be referred to interchangeably as, e.g., lines, pipes, feeds, gases, products, discharges, parts, portions, or streams.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator which latter may be operated at higher pressure.

As used herein, the term "substantially" can mean an amount of at least generally about 80%, preferably about 90%, and optimally about 99%, by mole, of a compound or class of compounds in a stream.

As used herein, the terms "adsorbent" and "adsorber" include, respectively, an absorbent and an absorber, and relates, but is not limited to, processes such as absorption and/or adsorption.

As used herein, the term "gas" can include one or more gases, liquids, and/or solids in the form of a suspension, such as an aerosol.

As used herein, the term "purified natural gas product" may refer to a natural gas that has passed through an adsorber to remove, e.g., carbon dioxide and/or water, and includes a natural gas product that has undergone subsequent processing, such as filtering of particulates.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description. The Figures have been simplified by the deletion of a large number of apparatuses customarily employed in a process of this nature, such as vessel internals, temperature and pressure controls systems, flow control valves, recycle pumps, etc. which are not specifically required to illustrate the performance of the invention. Furthermore, the illustration of the process of this invention in the embodiment of a specific drawing is not intended to limit the invention to specific embodiments set out herein.

Embodiments of the present disclosure are directed to temperature swing adsorption systems and methods for purifying fluids using temperature swing adsorption systems. The embodiments employ a novel TSA apparatus and process to overcome the problem associated with the presence of oxygen and sulfur compounds in natural gas feed streams.

An exemplary embodiment of the temperature swing process and apparatus is addressed with reference to a process and apparatus 100. The process and apparatus 100 includes a filter coalescer 120, a first adsorption bed 130, a particle filter 140, a second adsorption bed 150, a third adsorption bed 160, a guard bed 170, a regeneration gas cooler 180 and a regeneration gas separator 190. Generally, each of the adsorber 130, 150, and 160 undergoes three stages, namely an adsorption stage, a heating regeneration stage, and a cooling regeneration stage. Each of the adsorber 130, 150 and 160 can contain any suitable adsorbent, or a combination of adsorbents. Although the instant embodiment has been explained with respect to three adsorbent beds, the process can be practiced in a four bed (or more) temperature swing adsorption arrangement. Suitable adsorbents may include one or more crystalline molecular sieves, activated carbons, activated clays, silica gels, activated aluminas and combinations thereof, as disclosed in, e.g., U.S. Pat. No. 5,089,034. Molecular sieves include, for example, the various forms of silicoaluminophosphates and aluminophosphates, as disclosed in, e.g., U.S. Pat. No. 4,440,871 and U.S. Pat. No. 4,310,440.

Zeolites that may be used as adsorbents include, chabazite, also referred to as zeolite D, clinoptilolite, erionite, faujasite, also referred to as zeolite X and zeolite Y, ferrierite, mordenite, zeolite A and zeolite P. Other zeolites that may be suitable for use may be those having a high silica content, i.e., those having silica to alumina ratios greater than 10. Exemplary zeolites are disclosed in, e.g., U.S. Pat. No. 4,061,724, U.S. Pat. No. 4,073,865, U.S. Pat. No. 4,775,396, and U.S. Pat. No. 4,935,580.

A feed stream in line 112 may be passed to the first adsorption bed 130 to adsorb one or more contaminants from the feed stream. In accordance with an exemplary embodiment as shown in the FIG. 1, the feed stream in line 112 may be provided to the filter coalescer 120 to separate liquids from the feed stream, which may be in a gas phase. Generally, the liquids exit the filter coalescer 120 as a condensate stream in line 124 and a remainder of the feed stream is obtained as a filtered feed stream in line 122.

In various embodiments, a natural gas may be utilized as a feed stream. Typically, the feed stream can include one or more $C_1$-$C_6$ hydrocarbons, preferably one or more $C_1$-$C_2$ hydrocarbons. Generally, the natural gas includes at least about 70%, by mole, of one or more $C_1$ and $C_2$ hydrocarbons, such as methane and ethane, and preferably at least about 90%, optimally about 95%, by mole, of methane. Heavy hydrocarbons, for example, such as $C_{5+}$ hydrocarbons acts as contaminants in subsequent processing of the natural gas and hence are desired to be removed. In addition to the heavy hydrocarbons, the natural gas may include impurities such as oxygen and sulfur compounds. A natural gas may be obtained from natural sources, such as one or more wells, or synthetic sources such as one or more gasifiers or landfills.

As shown in FIG. 1, the filtered feed stream in line 122 is passed to the first adsorption bed 130. The first adsorption bed 130 can be operated at any suitable temperature and pressure, as disclosed above. The temperature during adsorption may be about 0° to about 70° C., preferably about 15° to about 50° C. Generally, the adsorption temperature is above the hydrocarbon dew point or the temperature of hydrate formation. Typically, the filtered feed stream in line 122 passes through the first adsorption bed 130 in generally a downflow direction. A product stream in line 132 is withdrawn from the first adsorption bed 130. The product stream in line 132, substantially depleted of contaminants, is withdrawn leaving the contaminants substantially adsorbed on the adsorbent material in the first adsorption bed 130. As shown in FIG. 1, the product stream may pass through a particle filter 140 to remove particles to provide a clean gas stream in line 142. The clean gas stream in line 142 can be in a suitable condition for subsequent processes, such as liquefaction.

In accordance with an exemplary embodiment as shown in FIG. 1, a portion of the clean gas stream in line 142 is taken as a make-up regeneration gas in line 144 and may be passed through the regeneration gas separator 190.

Referring to the second adsorption bed 150, a regeneration gas separator overhead stream in line 192 may be passed to the second adsorption bed 150 to reduce a temperature of the second adsorption bed and provide a second adsorption bed effluent stream in line 152. Subsequently, as shown in FIG. 1, the second adsorption bed effluent stream in line 152 may be passed to a heater 154 to increase a temperature of the second adsorption bed effluent stream to generate a hot regeneration effluent stream in line 156 (heater effluent temperature is greater than the temperature of the incoming stream to the heater). The heater 154 is supplied with a means of providing heat to the entering gas stream. For example, the heater may include an electric heater, a steam heater, a fired heater, a hot oil heater, or other types of heater known in the art. The hot regeneration effluent stream from the heater 154 is sent to the third adsorption bed 160. The hot regeneration effluent stream causes desorption of the contaminants from the adsorbent material in the third adsorption bed 160 and form a regeneration effluent stream in line 162. Accordingly, the hot regeneration effluent stream is passed to the third adsorption bed 160 to regenerate the third adsorption bed via an increase in a temperature of the third adsorption bed 160 and provide the regeneration effluent stream in line 162. As described previously, the feed stream may contain oxygen and sulfur compounds as impurities. The presence of these oxygen and sulfur compounds can cause operating issues for such adsorbent based system. Specifically, the presence of oxygen in the hot regeneration effluent stream can lead to poor performance due to the reaction of oxygen with hydrocarbons in the downstream steps.

Accordingly, applicants have proposed that as shown in the FIG. 1, at least a portion of the regeneration effluent stream from the third adsorption bed 160 may be passed to the guard bed 170 to remove one or more impurities comprising sulfur and oxygen compounds. In accordance with an exemplary embodiment, the guard bed 170 may include a copper based adsorbent to remove the one or more impurities comprising sulfur and oxygen compounds from the regeneration effluent stream. Applicants have found that oxygen does not get adsorbed on the adsorbent used for hydrocarbon removal, but it can remain in a void space of the adsorbent bed. Further, applicants have discovered that a substantial portion of the oxygen and sulfur compounds can be purged or flushed out of the bed and the bed still remains cool, below the oxygen reaction temperature of 150° C. during the initial part of the regeneration step in the third adsorption bed 160. In various embodiments, at least about 80%, preferably about 90%, and optimally about 99%, by weight, oxygen and sulfur compounds are removed before the third adsorption bed reaches a temperature of about 150° C. In an aspect, all of the oxygen is removed before the third adsorption bed 160 reaches a temperature of 150° C. As a result, no oxygen reaction can occur when the third adsorption bed reaches a temperature above 150° C.

Figure 1B:
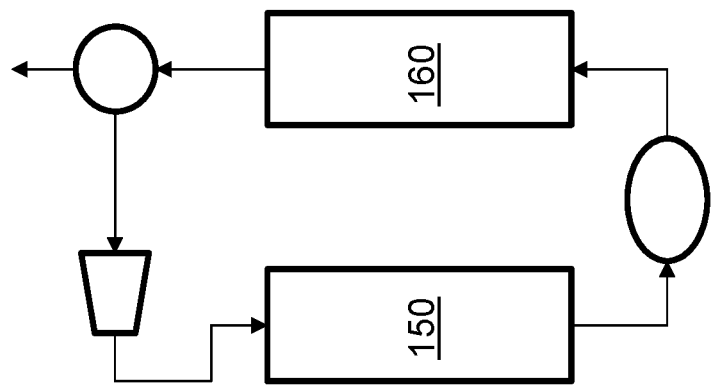
FIG. 1a and FIG. 1b are schematic illustration of two stages of the exemplary apparatus of FIG. 1.
Figure 1B:
Figure 1A:
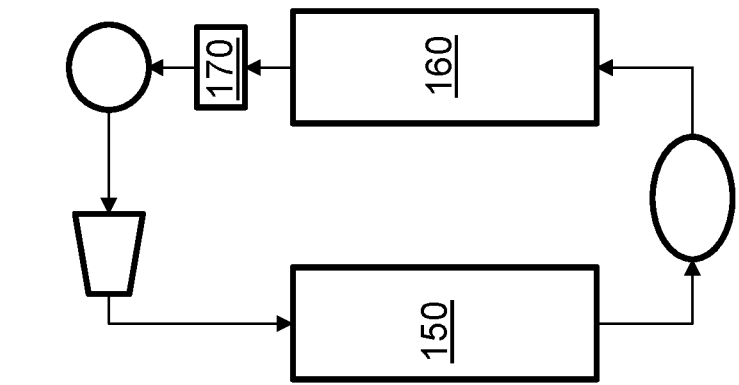
Figure 1A:

A treated regeneration effluent stream is obtained in line 172, substantially devoid of oxygen and sulfur compounds, from the guard bed 170 is withdrawn and can be reused as a regeneration gas in a closed loop manner as described in subsequent steps. As shown in the FIG. 1, the treated regeneration effluent stream in line 172 may be passed to the regeneration gas separator 190. In various embodiments, a valve 164 is open for a specified time till a substantial portion of the oxygen and sulfur compounds are removed from the regeneration effluent stream. Subsequently, after the removal of oxygen and sulfur compounds, the valve 164 is closed and a valve 166 is opened and the regeneration effluent stream in line 162 can pass through the regeneration gas cooler 180 to provide a cooled regeneration effluent 182 which can be subsequently passed to the regeneration gas separator 190. The two stages are depicted in a simplified process schemes in FIG. 1 and FIG. 1b respectively. FIG. 1a shows the simplified illustration of the apparatus when the valve 164 is open and the valve 166 is closed and the regeneration effluent stream in line 162 passes through the guard bed 170. FIG. 1b shows the simplified version of the apparatus with the valve 166 open and valve 164 closed, after a substantial portion of the oxygen and sulfur compounds have been removed and the regeneration effluent stream passes through the regeneration gas cooler 180. In an embodiment, both the valves 164 and 166 may be open. In such an embodiment, a portion of the regeneration effluent may pass through the guard bed 170 while a remaining portion may pass through the regeneration gas cooler 180.

A bottoms liquid stream is separated in line 194 in the regeneration gas separator 190 to obtain the regeneration gas separator overhead stream in line 192 which may be passed to second adsorption bed 150 and processed subsequently as previously described. In accordance with an exemplary embodiment as shown in the FIG. 1, the regeneration gas separator overhead stream may be passed through a regeneration gas blower 196 to increase the pressure of the regeneration gas separator overhead stream prior to passing through the second adsorption bed 150.

Figure 2:
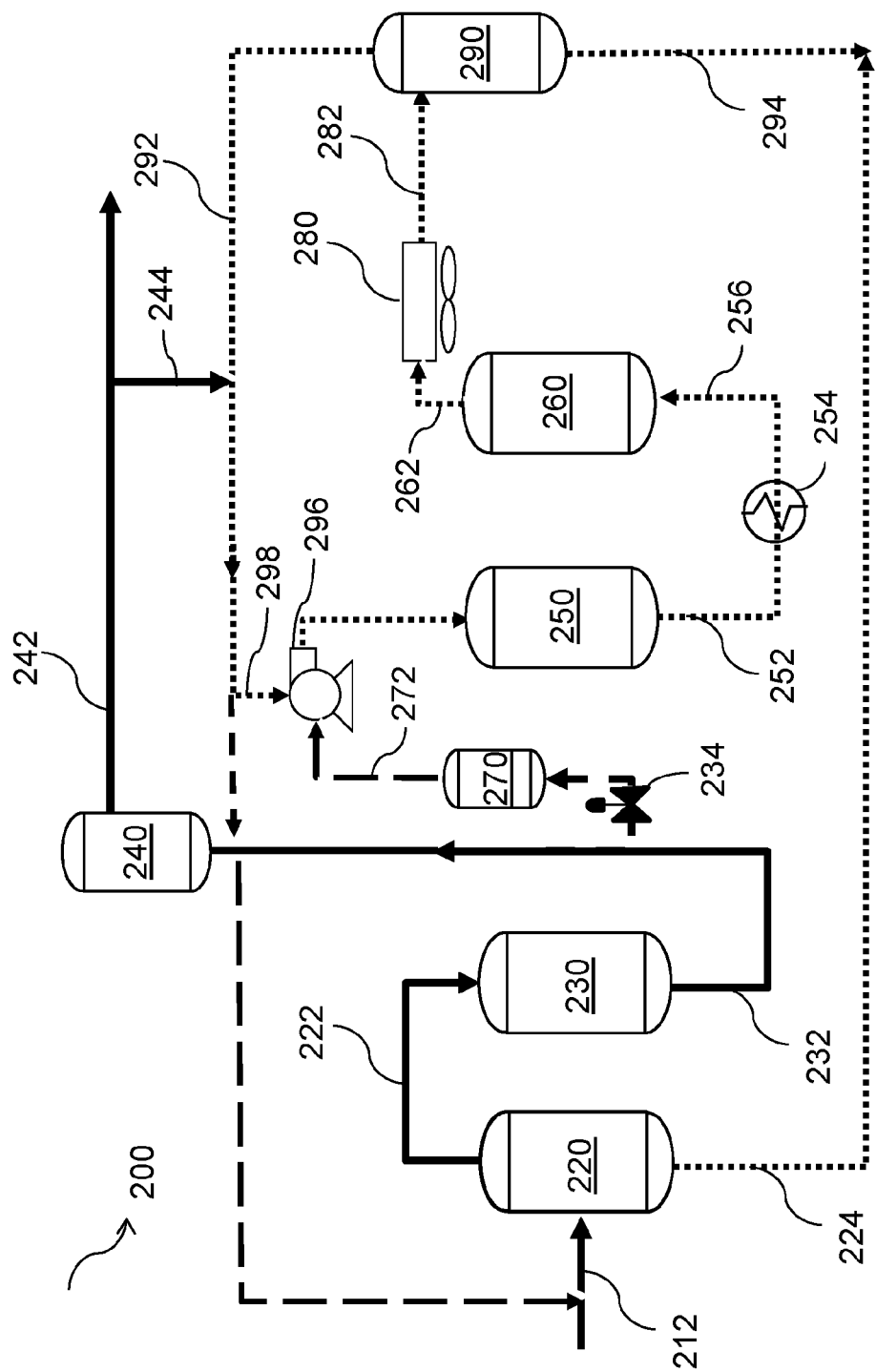
FIG. 2 is a schematic depiction of an exemplary apparatus according to another exemplary embodiment.

Turning now to FIG. 2, another embodiment of the temperature swing adsorption process and apparatus is addressed with reference to a process and apparatus 200. Although not limited to, typically, the instant flow scheme is suitable for feed streams comprising mercaptans as contaminants. The process and apparatus 200 includes a filter coalescer 220, a first adsorption bed 230, a particle filter 240, a second adsorption bed 250, a third adsorption bed 260, a guard bed 270, a regeneration gas cooler 280 and a regeneration gas separator 290. Each of the adsorber 230, 250, and 260 undergoes three stages, namely an adsorption stage, a heating regeneration stage, and a cooling regeneration stage. Further, each of the adsorber 230, 250 and 260 can contain any suitable adsorbent, or a combination of adsorbents and have similar operating conditions as described with respect to the FIG. 1, unless specified otherwise. Further, operating conditions and other specifics of other apparatus elements in the FIG. 2 are similar to corresponding apparatus elements of the FIG. 1, unless specified otherwise.

Further, various feed streams as described with respect to the FIG. 1, can be used in the instant embodiment. In accordance with an exemplary embodiment, the feed stream in line 212 may be passed to the first adsorption bed 230 to adsorb one or more contaminants from the feed stream. In accordance with an exemplary embodiment as shown in the FIG. 2, the feed stream in line 212 may be provided to a filter coalescer 220 to separate liquids from the feed stream, which may be in a gas phase. Generally, the liquids exit the coalescer 220 as a condensate stream in line 224 and a remainder of the feed stream is obtained as a filtered feed stream in line 222. Subsequently, the filtered feed stream in line 222 is passed to the first adsorption bed 230.

In accordance with the instant embodiment as discussed, the feed stream in line 212 may include mercaptan compounds as contaminants. The mercaptans can react with copper present in guard bed 270 and can result in undesirable compounds, hence affecting the functioning of the guard bed 270. In the instant embodiment, applicants propose to remove the mercaptan compounds upstream of the guard bed 270 by adsorbing the mercaptan compounds. Accordingly, the first adsorbent bed 230 adsorbs the mercaptan compounds to provide to produce a product stream in line 232 substantially devoid of mercaptan compounds. In various embodiments, the product stream in line 232 includes less than about 10 wt % of mercaptan compounds, preferably at least about 5 wt %, optimally about 1 wt %, of mercaptan compounds. In an aspect, all of the mercaptans may be removed by the first adsorbent bed 230.

Figure 2B:
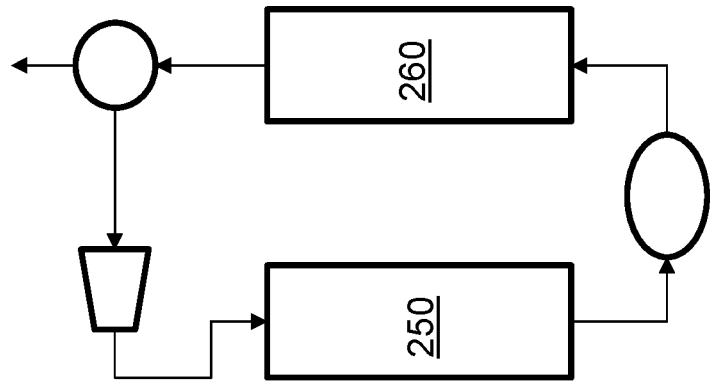
FIG. 2a and FIG. 2b are schematic illustration of two stages of the exemplary apparatus of FIG. 2.
Figure 2A:
Figure 2A:
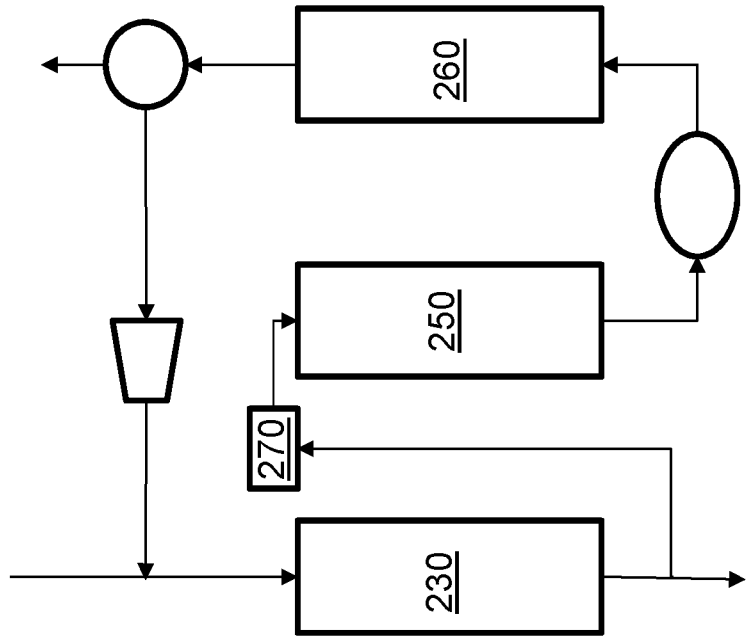

A first portion of the product stream in line 234 may be passed to the guard bed 270 to remove one or more impurities comprising oxygen and sulfur compounds to provide a treated product stream in line 272. Further, as shown in the FIG. 2, the remaining portion of the product stream is passed through the particle filter 240 to remove particles to provide a clean gas stream in line 242. In various embodiments, a valve 234 is open for a specified time till a substantial portion of the oxygen and sulfur compounds are removed from the first portion being passed to the second adsorption bed 250. Subsequently, after the removal of oxygen and sulfur compounds, the valve 234 is closed. The two stages are depicted in a simplified process schemes in FIG. 2a and FIG. 2b respectively. FIG. 2a shows the simplified illustration of the process flow scheme, when the valve 234 is open. FIG. 2b shows the simplified illustration of the process flow scheme with the valve 234 is closed. The treated product stream in line 272 may be passed to the second adsorption bed 250 to reduce a temperature of the second adsorption bed 250 and provide a second adsorption bed effluent stream in line 252. In accordance with an exemplary embodiment as shown in FIG. 1, the treated product stream may be passed through a regeneration gas blower 296 to increase a pressure of the treated product stream prior to passing through the second adsorption bed 250.

The second adsorption bed effluent stream in line 252 may be passed to a heater 254 to increase a temperature of the second adsorption bed effluent stream to generate a hot regeneration effluent stream in line 256. Subsequently, the hot regeneration effluent stream may be passed to the third adsorption bed 260 to regenerate the third adsorption bed 260 via an increase in a temperature of the third adsorption bed and provide a regeneration effluent stream in line 262. The regeneration effluent stream in line 262 may be passed to the regeneration gas cooler 280 to provide a cooled regeneration effluent in line 282. Thereafter, the cooled regeneration effluent may be passed to the regeneration gas separator 290 to provide a regeneration gas separator overhead stream in line 292 and a liquid stream in line 294. The regeneration gas separator overhead stream in line 292 may be subsequently passed to the first adsorption bed 230. Further, as shown in FIG. 2, a portion of clean gas stream in line 242 is taken as a make-up regeneration gas in line 244 and may be passed to the regeneration gas separator overhead stream in line 292. In accordance with an exemplary embodiment as shown in FIG. 2, a portion of the regeneration gas separator overhead stream in line 298 may be passed to the regeneration gas blower 296 and subsequently to the second adsorption bed 250 and processed further as previously described.

Example

The following is an example of a temperature swing adsorption process in accordance with an exemplary embodiment, that is similarly configured to the process and apparatus 100 illustrated in FIG. 1. The example is provided for illustration purposes only and is not meant to limit the various embodiments of processes and apparatuses for purifying fluids using temperature swing adsorption systems.

An exemplary case study was conducted to understand the impact of the instant process scheme.

A natural gas feed stream at a flow rate of 880 MMSCFD at 60 bar and 22° C. with a composition shown in the following table is to be removed of its heavy hydrocarbon contents before liquefaction. There is 80 ppm oxygen and 4 ppm $H_2S$ in the feed. The gas is treated using a 4 bed TSA unit in accordance with the process as depicted in FIG. 1 with a regeneration time of 55 minutes and a regeneration flow of 56 MMSCFD. The guard bed includes a reduced copper adsorbent (UOP's GB 610) for removal of oxygen and sulfur compounds.

TABLE

Feed Properties

| | |
|---|---|
| 22-Mpropane | 2.44E−05 |
| Benzene | 1.47E−04 |
| C1 | 9.04E−01 |
| C2 | 7.98E−02 |
| C3 | 9.49E−03 |
| C4 | 2.03E−03 |
| 2-Mpentane | 3.16E−04 |
| CO2 | 2.30E−05 |
| Cyclohexane | 1.01E−04 |
| N2 | 2.80E−03 |
| C5 | 1.19E−03 |
| C6 | 2.61E−04 |
| C7 | 1.29E−04 |
| C8 | 1.07E−05 |
| C9 | 1.06E−05 |
| o-Xylene | 3.38E−05 |
| Toluene | 9.09E−05 |
| Oxygen | 8.00E−05 |
| H2S | 4.00E−06 |

Based on a dynamic adsorption process simulation, it was found that $O_2$ remaining in the adsorbent bed at the end of the adsorption step can be entirely purged out of the bed in the first 5 minutes of the hot regeneration step. And the bed temperatures are mostly well below 150° C., with no possibility of any oxygen reaction. The regeneration effluent stream now containing oxygen and sulfur compounds, but still at a low temperature can be bypassed around the regeneration gas cooler and sent to the guard bed in the first 5 minutes. After 5 minutes into the regeneration step, the regeneration effluent stream can be switched to the regeneration cooler bypassing the guard bed. The entire regeneration loop including both cooling and heating beds is completely oxygen free after 5 minutes.

Specific Embodiments

While the following is described in conjunction with specific embodiments, it will be understood that this description is intended to illustrate and not limit the scope of the preceding description and the appended claims.

A first embodiment of the invention is a temperature swing adsorption process comprising passing a feed stream to a first adsorption bed to adsorb one or more contaminants comprising heavy hydrocarbons from the feed stream to produce a product stream; passing a regeneration gas separator overhead stream to a second adsorption bed to reduce a temperature of the second adsorption bed and provide a second adsorption bed effluent stream; passing the second adsorption bed effluent stream to a heater to increase a temperature of the second adsorption bed effluent stream to generate a hot regeneration effluent stream; passing the hot regeneration effluent stream to a third adsorption bed to regenerate the third adsorption bed via an increase in a temperature of the third adsorption bed and provide a regeneration effluent stream; passing at least a portion of the regeneration effluent stream to a guard bed to remove one or more impurities comprising sulfur and oxygen compounds to provide a treated regeneration effluent stream; and passing the treated regeneration effluent stream to a regeneration gas separator to separate a liquid stream and provide the regeneration gas separator overhead stream. An embodiment of the invention is one, any or all of prior embodiments in this paragraph up through the first embodiment in this paragraph, wherein a substantial portion of the oxygen impurities are removed before the third adsorption bed achieves the temperature of about 150° C. An embodiment of the invention is one, any or all of prior embodiments in this paragraph up through the first embodiment in this paragraph, wherein about 100% of the oxygen impurities are removed before the third adsorption bed achieves the temperature of about 150° C. An embodiment of the invention is one, any or all of prior embodiments in this paragraph up through the first embodiment in this paragraph, wherein the entire regeneration effluent stream is passed to the guard bed. An embodiment of the invention is one, any or all of prior embodiments in this paragraph up through the first embodiment in this paragraph further comprises passing a remaining portion of the regeneration effluent stream to a regeneration gas cooler to provide a cooled regeneration effluent, the cooled regeneration effluent being passed to the regeneration gas separator. An embodiment of the invention is one, any or all of prior embodiments in this paragraph up through the first embodiment in this paragraph further comprising passing the regeneration gas separator overhead stream through a regeneration gas blower to increase a pressure of the regeneration gas separator overhead stream prior to passing through the second adsorption bed. An embodiment of the invention is one, any or all of prior embodiments in this paragraph up through the first embodiment in this paragraph further comprising passing the product stream through a particle filter to remove particles to provide a clean gas stream. An embodiment of the invention is one, any or all of prior embodiments in this paragraph up through the first embodiment in this paragraph further comprising taking a portion of clean gas stream as a make-up regeneration gas line and passing the make-up regeneration gas through the regeneration gas separator. An embodiment of the invention is one, any or all of prior embodiments in this paragraph up through the first embodiment in this paragraph further comprising passing the feed stream through a filter coalescer to separate liquid from the feed stream. An embodiment of the invention is one, any or all of prior embodiments in this paragraph up through the first embodiment in this paragraph, wherein the guard bed comprises a copper based adsorbent to remove one or more impurities comprising sulfur and oxygen compounds from the regeneration effluent stream.

A second embodiment of the invention is a temperature swing adsorption system comprising a first adsorption bed configured to receive a feed stream and adsorb one or more contaminants from the feed stream to produce a product stream; a second adsorption bed in downstream communication with a regeneration gas separator overhead line comprising a regeneration gas separator overhead stream to reduce a temperature of the second adsorption bed and provide a second adsorption bed effluent stream; a heater in downstream communication with the second adsorption bed and configured to increase a temperature of the second adsorption bed effluent stream to generate a hot regeneration effluent stream; a third adsorption bed in downstream communication with the second adsorption bed and configured to receive the hot regeneration effluent stream to regenerate the third adsorption bed via an increase a temperature of the third adsorption bed and provide a regeneration effluent stream in a regeneration effluent line; a guard bed in downstream communication with the regeneration effluent line configured to remove one or more impurities comprising sulfur and oxygen compounds to provide a treated regeneration effluent stream in a treated regeneration effluent line; and a regeneration gas separator in downstream communication with the treated regeneration effluent line to separate a liquid stream and provide the regeneration gas separator overhead stream. An embodiment of the invention is one, any or all of prior embodiments in this paragraph up through the second embodiment in this paragraph further comprising an auxiliary regeneration effluent line in downstream communication with the regeneration effluent line, the auxiliary regeneration effluent line comprising a portion of the regeneration effluent stream. An embodiment of the invention is one, any or all of prior embodiments in this paragraph up through the second embodiment in this paragraph, herein the regeneration gas cooler being in downstream communication with the auxiliary regeneration effluent line to provide a cooled regenerated effluent in a cooled regeneration effluent line, the regeneration gas separator being in downstream communication with the cooled regeneration effluent line. An embodiment of the invention is one, any or all of prior embodiments in this paragraph up through the second embodiment in this paragraph further comprising a particle filter in communication with the first adsorption bed to provide a clean gas stream in a clean gas line. An embodiment of the invention is one, any or all of prior embodiments in this paragraph up through the second embodiment in this paragraph further comprising a make-up regen gas line in downstream communication with clean gas line, the make-up regen gas line comprising a portion of the clean gas stream. An embodiment of the invention is one, any or all of prior embodiments in this paragraph up through the second embodiment in this paragraph, wherein the regeneration gas separator is in downstream communication with the make-up regen gas line.

A third embodiment of the invention is a temperature swing adsorption process comprising passing a feed stream to a first adsorption bed to adsorb one or more contaminants comprising heavy hydrocarbons from the feed stream to produce a product stream; passing a first portion of the product stream to a guard bed to remove one or more impurities comprising oxygen and sulfur compounds to provide a treated product stream; passing the treated product stream to a second adsorption bed to reduce a temperature of the second adsorption bed and provide a second adsorption bed effluent stream; passing the second adsorption bed effluent stream to a heater to increase a temperature of the second adsorption bed effluent stream to generate a hot regeneration effluent stream; passing the hot regeneration effluent stream to a third adsorption bed to regenerate the third adsorption bed via an increase in a temperature of the third adsorption bed and provide a regeneration effluent stream; passing the regeneration effluent stream to a regeneration gas cooler to provide a cooled regeneration effluent; passing the cooled regeneration effluent to the regeneration gas separator to provide a regeneration gas separator overhead stream and liquid stream; and passing the regeneration gas separator overhead stream to the first adsorption bed. An embodiment of the invention is one, any or all of prior embodiments in this paragraph up through the third embodiment in this paragraph, wherein the first adsorption bed removes a one or more mercaptan compounds present in the feed stream. An embodiment of the invention is one, any or all of prior embodiments in this paragraph up through the third embodiment in this paragraph further comprising passing a remaining portion of the product stream through a particle filter to provide a clean gas stream. An embodiment of the invention is one, any or all of prior embodiments in this paragraph up through the third embodiment in this paragraph, wherein adsorbing the one more contaminants from the feed stream comprises adsorbing the contaminants on a silicon gel adsorbent.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A temperature swing adsorption process comprising:
passing a feed stream to a first adsorption bed to adsorb one or more contaminants comprising heavy hydrocarbons from the feed stream to produce a product stream;
passing a regeneration gas separator overhead stream to a second adsorption bed to reduce a temperature of the second adsorption bed and provide a second adsorption bed effluent stream;

passing the second adsorption bed effluent stream to a heater to increase a temperature of the second adsorption bed effluent stream to generate a hot regeneration effluent stream;

passing the hot regeneration effluent stream to a third adsorption bed to regenerate the third adsorption bed via an increase in a temperature of the third adsorption bed and provide a regeneration effluent stream;

passing at least a portion of the regeneration effluent stream to a guard bed to remove one or more impurities comprising sulfur and oxygen compounds to provide a treated regeneration effluent stream; and passing the treated regeneration effluent stream to a regeneration gas separator to separate a liquid stream and provide the regeneration gas separator overhead stream.

2. The process of claim 1, wherein a substantial portion of the oxygen impurities are removed before the third adsorption bed achieves the temperature of about 150° C.

3. The process of claim 2, wherein about 100% of the oxygen impurities are removed before the third adsorption bed achieves the temperature of about 150° C.

4. The process of claim 1, wherein the entire regeneration effluent stream is passed to the guard bed.

5. The process of claim 1 further comprises passing a remaining portion of the regeneration effluent stream to a regeneration gas cooler to provide a cooled regeneration effluent, the cooled regeneration effluent being passed to the regeneration gas separator.

6. The process of claim 1 further comprising passing the regeneration gas separator overhead stream through a regeneration gas blower to increase a pressure of the regeneration gas separator overhead stream prior to passing through the second adsorption bed.

7. The process of claim 1 further comprising passing the product stream through a particle filter to remove particles to provide a clean gas stream.

8. The process of claim 7 further comprising taking a portion of clean gas stream as a make-up regeneration gas line and passing the make-up regeneration gas through the regeneration gas separator.

9. The process of claim 1 further comprising passing the feed stream through a filter coalescer to separate liquid from the feed stream.

10. The process of claim 1, wherein the guard bed comprises a copper based adsorbent to remove one or more impurities comprising sulfur and oxygen compounds from the regeneration effluent stream.

11. A temperature swing adsorption apparatus comprising:
a first adsorption bed configured to receive a feed stream and adsorb one or more contaminants from the feed stream to produce a product stream;

a second adsorption bed in downstream communication with a regeneration gas separator overhead line comprising a regeneration gas separator overhead stream to reduce a temperature of the second adsorption bed and provide a second adsorption bed effluent stream;

a heater in downstream communication with the second adsorption bed and configured to increase a temperature of the second adsorption bed effluent stream to generate a hot regeneration effluent stream;

a third adsorption bed in downstream communication with the second adsorption bed and configured to receive the hot regeneration effluent stream to regenerate the third adsorption bed via an increase a temperature of the third adsorption bed and provide a regeneration effluent stream in a regeneration effluent line;

a guard bed in downstream communication with the regeneration effluent line configured to remove one or more impurities comprising sulfur and oxygen compounds to provide a treated regeneration effluent stream in a treated regeneration effluent line; and a regeneration gas separator in downstream communication with the treated regeneration effluent line to separate a liquid stream and provide the regeneration gas separator overhead stream.

12. The apparatus of claim 11 further comprising an auxiliary regeneration effluent line in downstream communication with the regeneration effluent line, the auxiliary regeneration effluent line comprising a portion of the regeneration effluent stream.

13. The apparatus of claim 12, herein the regeneration gas cooler being in downstream communication with the auxiliary regeneration effluent line to provide a cooled regenerated effluent in a cooled regeneration effluent line, the regeneration gas separator being in downstream communication with the cooled regeneration effluent line.

14. The apparatus of claim 11 further comprising a particle filter in communication with the first adsorption bed to provide a clean gas stream in a clean gas line.

15. The apparatus of claim 14 further comprising a make-up regen gas line in downstream communication with clean gas line, the make-up regen gas line comprising a portion of the clean gas stream.

16. The apparatus of claim 15, wherein the regeneration gas separator is in downstream communication with the make-up regen gas line.

17. A temperature swing adsorption process comprising:
passing a feed stream to a first adsorption bed to adsorb one or more contaminants comprising heavy hydrocarbons from the feed stream to produce a product stream;

passing a first portion of the product stream to a guard bed to remove one or more impurities comprising oxygen and sulfur compounds to provide a treated product stream;

passing the treated product stream to a second adsorption bed to reduce a temperature of the second adsorption bed and provide a second adsorption bed effluent stream;

passing the second adsorption bed effluent stream to a heater to increase a temperature of the second adsorption bed effluent stream to generate a hot regeneration effluent stream;

passing the hot regeneration effluent stream to a third adsorption bed to regenerate the third adsorption bed via an increase in a temperature of the third adsorption bed and provide a regeneration effluent stream;

passing the regeneration effluent stream to a regeneration gas cooler to provide a cooled regeneration effluent;

passing the cooled regeneration effluent to the regeneration gas separator to provide a regeneration gas separator overhead stream and liquid stream; and passing the regeneration gas separator overhead stream to the first adsorption bed.

18. The process of claim 17, wherein the first adsorption bed removes a one or more mercaptan compounds present in the feed stream.

19. The process of claim 17 further comprising passing a remaining portion of the product stream through a particle filter to provide a clean gas stream.

20. The process of claim 17, wherein adsorbing the one more contaminants from the feed stream comprises adsorbing the contaminants on a silicon gel adsorbent.

\* \* \* \* \*